(12) United States Patent
Aoki

(10) Patent No.: US 7,675,732 B2
(45) Date of Patent: Mar. 9, 2010

(54) MULTILAYER CAPACITOR ARRAY

(75) Inventor: Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/051,316

(22) Filed: Mar. 19, 2008

(65) Prior Publication Data
US 2008/0239616 A1 Oct. 2, 2008

(30) Foreign Application Priority Data
Mar. 30, 2007 (JP) ............................. 2007-093376

(51) Int. Cl.
H01G 4/005 (2006.01)
H01G 4/30 (2006.01)
H01G 4/228 (2006.01)
(52) U.S. Cl. .................. 361/303; 361/301.4; 361/306.3
(58) Field of Classification Search ............. 361/301.4, 361/308.1, 306.1, 306.2, 306.3, 310, 303, 361/321.3, 309, 321.2, 302, 328, 329, 330
See application file for complete search history.

(56) References Cited

U.S. PATENT DOCUMENTS

| 5,815,367 | A * | 9/1998 | Asakura et al. ............. 361/303 |
| 6,850,404 | B2 * | 2/2005 | Engel et al. ............. 361/301.4 |
| 7,046,500 | B2 * | 5/2006 | Lee et al. ..................... 361/303 |
| 7,224,572 | B2 * | 5/2007 | Togashi et al. ........... 361/306.3 |
| 2004/0114305 | A1 * | 6/2004 | Gunter et al. ............ 361/306.1 |
| 2009/0040686 | A1 * | 2/2009 | Anthony .................. 361/306.3 |

FOREIGN PATENT DOCUMENTS

| JP | A-60-254608 | 12/1985 |
| JP | A-11-67586 | 3/1999 |
| JP | A-2000-331879 | 11/2000 |

OTHER PUBLICATIONS

Office Action issued in counterpart Japanese Application No. 2007-093376.

* cited by examiner

Primary Examiner—Eric Thomas
Assistant Examiner—David M Sinclair
(74) Attorney, Agent, or Firm—Oliff & Berridge, PLC

(57) ABSTRACT

A multilayer capacitor array includes a capacitor body having rectangular first and second main faces opposing each other. In the capacitor body having a dielectric characteristic, first inner electrodes are arranged in a first region, second inner electrodes are arranged in a second region, and third and fourth inner electrodes are arranged so as to extend over the first and second regions. Each of the third inner electrodes opposes at least one of the first inner electrodes and at least one of the second inner electrodes. Each of the fourth inner electrodes opposes at least one of the first inner electrodes and at least one of the second inner electrodes. The third inner electrodes are adjacent to the fourth inner electrodes, respectively.

2 Claims, 13 Drawing Sheets

MULTILAYER CAPACITOR ARRAY

BACKGROUND OF THE INVENTION

1. Field of the Invention

The present invention relates to a multilayer capacitor array.

2. Related Background Art

Conventionally known as a multilayer capacitor array is one comprising a capacitor body in which inner electrode layers having a plurality of inner electrodes arranged in a row are alternately laminated with dielectric layers, and a plurality of terminal electrodes formed on the capacitor body (see, for example, Japanese Patent Application Laid-Open No. 2000-331879).

When the multilayer capacitor array described in Japanese Patent Application Laid-Open No. 2000-331879 is seen in the opposing direction of the inner electrodes, a plurality of inner electrodes are arranged in a row while being separated from each other by a predetermined distance. Therefore, when seen in the opposing direction of the inner electrodes, there is an area having no inner electrodes between a plurality of inner electrodes opposing each other. Namely, a plurality of capacitors are formed by the opposing inner electrodes in the multilayer capacitor array, while the plurality of capacitors are clearly separated from each other by areas having no inner electrodes between the opposing inner electrodes.

SUMMARY OF THE INVENTION

When a voltage is applied to the multilayer capacitor array described in Japanese Patent Application Laid-Open No. 2000-331879, however, respective distortions occur in the plurality of capacitors in response to the applied voltage, whereby stresses caused by the distortions of the capacitors are concentrated at the areas having no inner electrodes between the capacitors.

It is an object of the present invention to provide a multilayer capacitor array which restrains stresses from being concentrated between a plurality of capacitors.

The present invention provides a multilayer capacitor array comprising a capacitor body including rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other, the capacitor body having a dielectric characteristic; first, second, third, and fourth terminal electrodes arranged on outer surface of the capacitor body; a plurality of first inner electrodes connected to the first terminal electrode and arranged within the capacitor body; a plurality of second inner electrodes connected to the second terminal electrode and arranged within the capacitor body; a plurality of third inner electrodes connected to the third terminal electrode and arranged within the capacitor body; and a plurality of fourth inner electrodes connected to the fourth terminal electrode and arranged within the capacitor body; wherein the capacitor body has a first region extending in an opposing direction of the first and second main faces, and a second region extending in the opposing direction of the first and second main faces and aligning with the first region along a direction orthogonal to the opposing direction of the first and second main faces; wherein the plurality of first inner electrodes are arranged within the first region; wherein the plurality of second inner electrodes are arranged within the second region; wherein the plurality of third inner electrodes are arranged so as to extend over the first and second regions; wherein the plurality of fourth inner electrodes are arranged so as to extend over the first and second regions; wherein each of the third inner electrodes is arranged within the capacitor body such as to oppose at least one of the plurality of first inner electrodes with a portion of the capacitor body therebetween in the opposing direction of the first and second main faces and oppose at least one of the plurality of second inner electrodes with a portion of the capacitor body therebetween in the opposing direction of the first and second main faces; wherein each of the fourth inner electrodes is arranged within the capacitor body such as to oppose at least one of the plurality of first inner electrodes with a portion of the capacitor body therebetween in the opposing direction of the first and second main faces and oppose at least one of the plurality of second inner electrodes with a portion of the capacitor body therebetween in the opposing direction of the first and second main faces; wherein each of the third inner electrodes is adjacent to one of the plurality of fourth inner electrodes with a portion of the capacitor body therebetween along the opposing direction of the first and second main faces; and wherein each of the fourth inner electrodes is adjacent to one of the plurality of third inner electrodes with a portion of the capacitor body therebetween along the opposing direction of the first and second main faces.

In the above-mentioned multilayer capacitor array, the first inner electrodes arranged within the first region of the capacitor body and the third and fourth inner electrodes form a capacitor, while the second inner electrodes arranged within the second region of the capacitor body and the third and fourth inner electrodes form another capacitor. Each of the third and fourth inner electrodes is arranged so as to extend over the first and second regions. Therefore, even when a voltage is applied to the capacitor formed by the first, third, and fourth inner electrodes and the capacitor formed by the second, third, and fourth inner electrodes, so that electrostriction is generated in the first and second regions by these capacitors, the third and fourth inner electrodes are arranged so as to extend over the first and second regions, whereby electrostriction also occurs between the first and second regions. This restrains stresses from being concentrated between the first and second regions of the capacitor body, i.e., between the two capacitors included in the capacitor array. The third and fourth inner electrodes are arranged adjacent to each other within the capacitor body. At a location where inner electrodes having the same polarity are adjacent to each other and oppose each other, no electric field occurs even when a voltage is applied to the multilayer capacitor array. This correspondingly suppresses the vibration of the multilayer capacitor array caused by the electrostriction.

Preferably, each first inner electrode is arranged at a position different from that of any of the plurality of second inner electrodes in the opposing direction of the first and second main faces. This yields a portion where the distance between the inner electrodes can be made greater, whereby the vibration of the multilayer capacitor array generated by the electrostriction can be suppressed.

The present invention can provide a multilayer capacitor array which restrains stresses from being concentrated between a plurality of capacitors.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions.

First Embodiment

Figure 1:
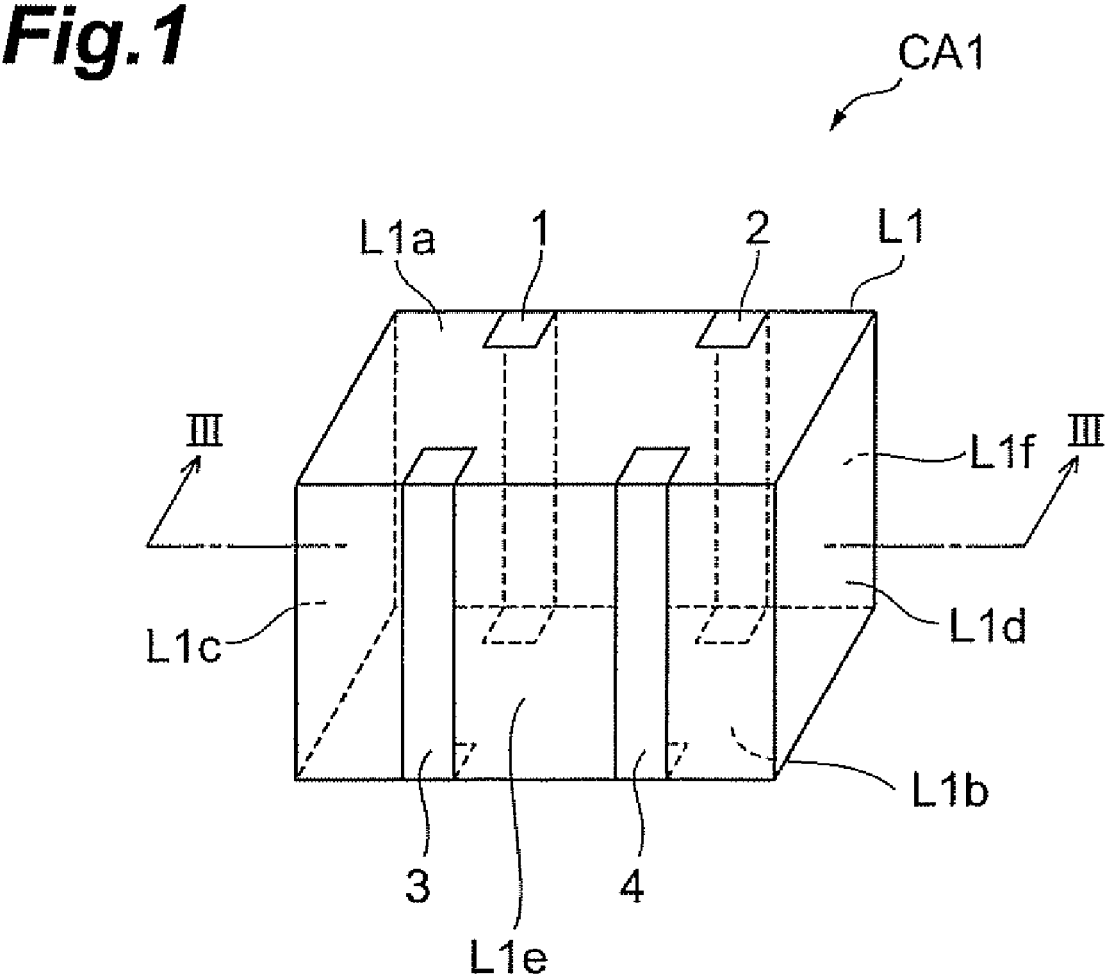
FIG. 1 is a perspective view of the multilayer capacitor array in accordance with the first embodiment.
Figure 2:
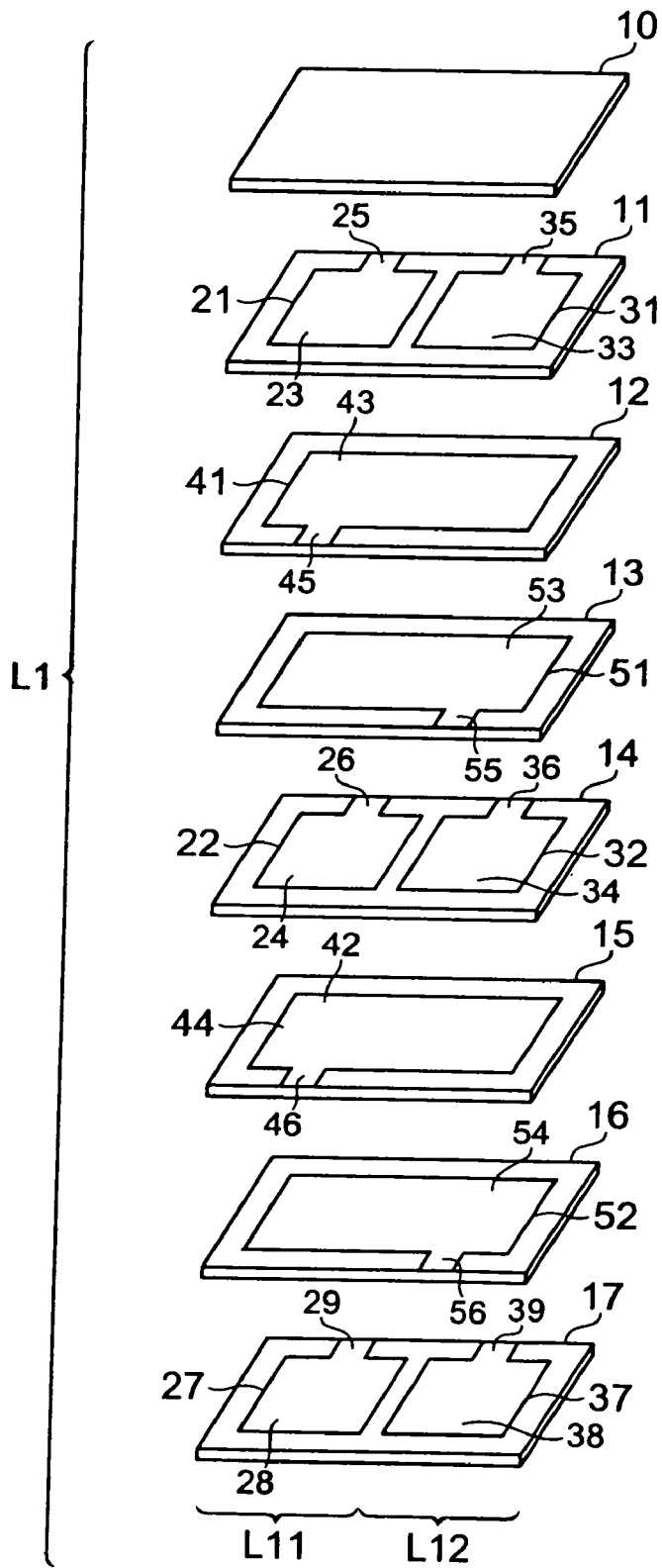
FIG. 2 is an exploded perspective view of the capacitor body included in the multilayer capacitor array in accordance with the first embodiment.
Figure 3:
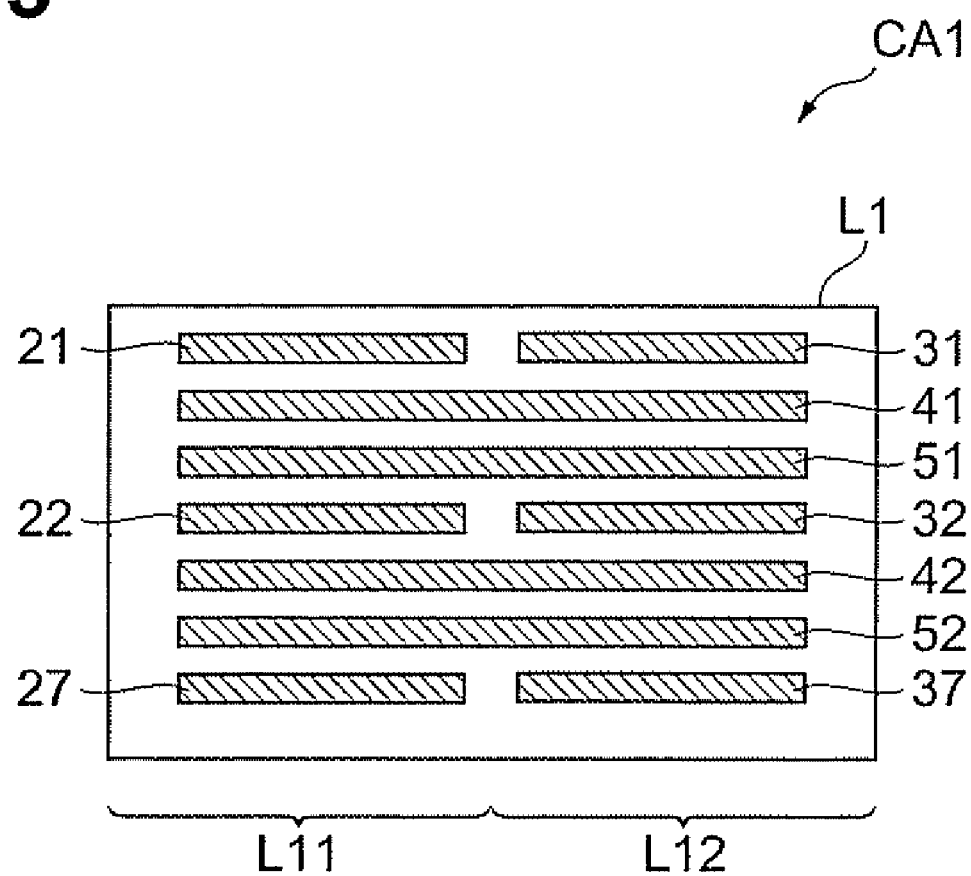
FIG. 3 is a view for explaining a cross-sectional structure of the multilayer capacitor array taken along the line III-III of FIG. 1.

With reference to FIGS. 1 to 3, the structure of the multilayer capacitor array CA1 in accordance with the first embodiment will be explained. FIG. 1 is a perspective view of the multilayer capacitor array in accordance with the first embodiment. FIG. 2 is an exploded perspective view of the capacitor body included in the multilayer capacitor array in accordance with the first embodiment, FIG. 3 is a view for explaining the structure of the multilayer capacitor array taken along the line III-III of FIG. 1.

As shown in FIG. 1, the multilayer capacitor array CA1 in accordance with the first embodiment comprises a capacitor body L1 and first to fourth terminal electrodes 1 to 4 arranged on outer surface of the capacitor body L1. The first to fourth terminal electrodes 1 to 4 are formed, for example, by attaching and burning a conductive paste, which contains a conductive metal powder and a glass frit, onto outer surface of the capacitor body. A plating layer may be formed on the burned terminal electrodes when necessary. The first to fourth terminal electrodes 1 to 4 are formed such as to be electrically insulated from each other on the surfaces of the capacitor body L1.

As shown in FIG. 1, the capacitor body L1 is shaped like a rectangular parallelepiped having rectangular first and second main faces L1$a$, L1$b$ opposing each other, first and second end faces L1$c$, L1$d$ opposing each other and extending in the shorter-side direction of the first and second main faces L1$a$, L1$b$ so as to connect them to each other, and first and second side faces L1$e$, L1$f$ opposing each other and extending in the longer-side direction of the first and second main faces L1$a$, L1$b$ so as to connect them to each other.

The first and second terminal electrodes 1, 2 are arranged on the second side face L1$f$ of the capacitor body L1. The first and second terminal electrodes 1, 2 are successively arranged from the first end face L1$c$ side to the second end face L1$d$ side. The third and fourth terminal electrodes 3, 4 are arranged on the first side face L1$e$ of the capacitor body L1 opposing the second side face L1$f$. The third and fourth terminal electrodes 3, 4 are successively arranged from the first end face L1$c$ side to the second end face L1$d$ side.

As shown in FIG. 2, the capacitor body L1 has a plurality of (8 in this embodiment) laminated dielectric layers 10 to 17. Each of the dielectric layers 10 to 17 is constituted by a sintered body of a ceramic green sheet containing a dielectric ceramic, for example. In the actual multilayer capacitor array CA1, the dielectric layers 10 to 17 are integrated to such an extent that their boundaries are indiscernible.

As shown in FIG. 2, a plurality (3 layers in this embodiment) of first inner electrodes 21, 22, 27, a plurality (3 layers in this embodiment) of second inner electrodes 31, 32, 37, a plurality (2 layers in this embodiment) of third inner electrodes 41, 42, and a plurality (2 layers in this embodiment) of fourth inner electrodes 51, 52 are arranged in the capacitor body L1. Each of the inner electrodes 21, 22, 27, 31, 32, 37, 41, 42, 51, 52 is constituted by a sintered body of a conductive paste, for example.

The first inner electrodes 21, 22, 27 are arranged in the first region L11 extending in the opposing direction of the first and second main faces L1$a$, L1$b$ within the capacitor body L1. The second inner electrodes 31, 32, 37 are arranged in the second region L12 extending in the opposing direction of the first and second main faces L1$a$, L1$b$ within the capacitor body L1.

The third inner electrodes 41, 42 are arranged within the capacitor body L1 so as to extend over the first and second regions L11, L12. Namely, the third inner electrodes 41, 42 are arranged within the capacitor body L1 so as to bridge the first and second regions L11, L12. The fourth inner electrodes 51, 52 are arranged within the capacitor body L1 so as to extend over the first and second regions L11, L12. Namely, the fourth inner electrodes 51, 52 are arranged within the capacitor body L1 so as to bridge the first and second regions L11, L12.

The first and second regions L11, L12 are arranged in a row along the opposing direction of the first and second end faces L1$c$, L1$d$, which is a direction orthogonal to the opposing direction of the first and second main faces L1$a$, L1$b$. Namely, in this embodiment, the first region L11 corresponds to an area on the first end face L1c side from the midpoints of the longer sides of the first and second main faces L1a, L1b in the capacitor body L1. The second region L12 corresponds to an area on the second end face L1d side from the midpoints of the longer sides of the first and second main faces L1a, L1b in the capacitor body L1.

Within the capacitor body L1, the first inner electrode 21 and second inner electrode 31 are arranged at the same position in the opposing direction of the first and second main faces L1a, L1b. Specifically, the first and second inner electrodes 21, 31 are positioned between the dielectric layers 10, 11. The first and second inner electrodes 21, 31 are arranged in a row along the opposing direction of the first and second end faces L1c, L1d in the capacitor body L1. The first inner electrode 21 is arranged on the side of the first end face L1c. The second inner electrode 31 is arranged on the side of the second end face L1d.

Within the capacitor body L1, the first inner electrode 22 and second inner electrode 32 are arranged at the same position in the opposing direction of the first and second main faces L1a, L1b. Specifically, the first and second inner electrodes 22, 32 are positioned between the dielectric layers 13, 14. The first and second inner electrodes 22, 32 are arranged in a row along the opposing direction of the first and second end faces L1c, L1d in the capacitor body L1. The first inner electrode 22 is arranged on the side of the first end face L1c. The second inner electrodes 32 is arranged on the side of the second end face L1d.

Within the capacitor body L1, the first inner electrode 27 and second inner electrode 37 are arranged at the same position in the opposing direction of the first and second main faces L1a, L1b. Specifically, the first and second inner electrodes 27, 37 are positioned between the dielectric layers 16, 17. The first and second inner electrodes 27, 37 are arranged in a row along the opposing direction of the first and second end faces L1c, L1d in the capacitor body L1. The first inner electrode 27 is arranged on the side of the first end face L1c. The second inner electrode 37 is arranged on the side of the second end face L1d.

Within the capacitor body L1, the plurality of inner electrodes are arranged in the order of the first and second inner electrodes 21, 31, third inner electrode 41, fourth inner electrode 51, first and second inner electrodes 22, 32, third inner electrode 42, fourth inner electrode 52, and first and second inner electrodes 27, 37 from the first main face L1a toward the second main face L1b.

Within the first region L11 of the capacitor body L1, the plurality of inner electrodes are arranged in the order of the first inner electrode 21, third inner electrode 41, fourth inner electrode 51, first inner electrode 22, third inner electrode 42, fourth inner electrode 52, and first inner electrode 27 from the first main face L1a toward the second main face L1b. Within the second region L12 of the capacitor body L1, the plurality of inner electrodes are arranged in the order of the second inner electrode 31, third inner electrode 41, fourth inner electrode 51, second inner electrode 32, third inner electrode 42, fourth inner electrode 52, and second inner electrode 37 from the first main face L1a toward the second main face L1b.

The opposing relationship within the first region L11 will now be explained in detail. The first and third inner electrodes 21, 41 oppose each other in the opposing direction of the first and second main faces L1a, L1b, with one dielectric layer 11 therebetween, the dielectric layer 11 being a portion of the capacitor body L1. The third and fourth inner electrodes 41, 51 oppose each other along the opposing direction of the first and second main faces L1a, L1b, with one dielectric layer 12 therebetween, the dielectric layer 12 being a portion of the capacitor body L1. The fourth and first inner electrodes 51, 22 oppose each other along the opposing direction of the first and second main faces L1a, L1b, with one dielectric layer 13 therebetween, the dielectric layer 13 being a portion of the capacitor body L1. The first and third inner electrodes 22, 42 oppose each other along the opposing direction of the first and second main faces L1a, L1b, with one dielectric layer 14 therebetween, the dielectric layer 14 being a portion of the capacitor body L1. The third and fourth inner electrodes 42, 52 oppose each other along the opposing direction of the first and second main faces L1a, L1b, with one dielectric layer 15 therebetween, the dielectric layer 15 being a portion of the capacitor body L1. The fourth and first inner electrodes 52, 27 oppose each other along the opposing direction of the first and second main faces L1a, L1b, with one dielectric layer 16 therebetween, the dielectric layer 16 being a portion of the capacitor body L1.

The opposing relationship within the second region L12 will now be explained in detail. The second and third inner electrodes 31, 41 oppose each other in the opposing direction of the first and second main faces L1a, L1b, with one dielectric layer 11 therebetween, the dielectric layer 11 being a portion of the capacitor body L1. The third and fourth inner electrodes 41, 51 oppose each other along the opposing direction of the first and second main faces L1a, L1b, with one dielectric layer 12 therebetween, the dielectric layer 12 being a portion of the capacitor body L1. The fourth and second inner electrodes S1, 32 oppose each other along the opposing direction of the first and second main faces L1a, L1b, with one dielectric layer 13 therebetween, the dielectric layer 13 being a portion of the capacitor body L1. The second and third inner electrodes 32, 42 oppose each other along the opposing direction of the first and second main faces L1a, L1b, with one dielectric layer 14 therebetween, the dielectric layer 14 being a portion of the capacitor body L1. The third and fourth inner electrodes 42, 52 oppose each other along the opposing direction of the first and second main faces L1a, L1b, with one dielectric layer 15 therebetween, the dielectric layer 15 being a portion of the capacitor body L1. The fourth and second inner electrodes 52, 37 oppose each other along the opposing direction of the first and second main faces L1a, L1b, with one dielectric layer 16 therebetween, the dielectric layer 16 being a portion of the capacitor body L1.

The third inner electrode 41 and fourth inner electrode 51 are adjacent to each other along the opposing direction of the first and second main faces L1a, L1b, with the dielectric layer 12 therebetween. The third inner electrode 42 and fourth inner electrode 52 are adjacent to each other along the opposing direction of the first and second main faces L1a, L1b, with the dielectric layer 15 therebetween.

The first inner electrodes 21, 22, 27 include quadrilateral main electrode portions 23, 24, 28, each having four sides two sides of which are parallel to the first and second end faces L1c, L1d and the other two sides of which are parallel to the first and second side faces L1e, L1f, and lead portions 25, 26, 29 extending from the main electrode portions 23, 24, 28 so as to be exposed at the second side face L1f. The lead portions 25, 26, 29 exposed at the second side face L1f are physically and electrically connected to the first terminal electrode 1. Namely, the first inner electrodes 21, 22, 27 are physically and electrically connected to the first terminal electrode 1.

The second inner electrodes 31, 32, 37 include quadrilateral main electrode portions 33, 34, 38, each having four sides two sides of which are parallel to the first and second end faces L1c, L1d and the other two sides of which are parallel to the first and second side faces L1e, L1f, and lead portions 35, 36, 39 extending from the main electrode portions 33, 34, 38 so as to be exposed at the second side face L1f. The lead portions 35, 36, 39 exposed at the second side face L1f are physically and electrically connected to the second terminal electrode 2. Namely, the second inner electrodes 31, 32, 37 are physically and electrically connected to the second terminal electrode 2.

The third inner electrodes 41, 42 include quadrilateral main electrode portions 43, 44, each having four sides two sides of which are parallel to the first and second end faces L1c, L1d and the other two sides of which are parallel to the first and second side faces L1e, L1f, and lead portions 45, 46 extending from the main electrode portions 43, 44 so as to be exposed at the first side face L1e. The lead portions 45, 46 exposed at the first side face L1e are physically and electrically connected to the third terminal electrode 3. Namely, the third inner electrodes 41, 42 are physically and electrically connected to the third terminal electrode 3.

The fourth inner electrodes 51, 52 include quadrilateral main electrode portions 53, 54, each having four sides parallel to the first and second end faces L1c, L1d and first and second side faces L1e, L1f, respectively, and lead portions 55, 56 extending from the main electrode portions 53, 54 so as to be exposed at the first side face L1e. The lead portions 55, 56 exposed at the first side face L1e are physically and electrically connected to the fourth terminal electrode 4. Namely, the fourth inner electrodes 51, 52 are physically and electrically connected to the fourth terminal electrode 4.

In the first region L11 of the capacitor body L1, as shown in FIGS. 2 and 3, the first inner electrodes 21, 22, 27 oppose the third and fourth inner electrodes 41, 42, 51, 52, with the dielectric layers 11, 13, 14, 16 therebetween. Therefore, the first inner electrodes 21, 22, 27 and third and fourth inner electrodes 41, 42, 51, 52 form a capacitance C11, thereby constructing one of capacitors included in the multilayer capacitor array CA1. In FIG. 3, the hatching of the region corresponding to the dielectric layers 10 to 17 is omitted for the convenience of viewing.

In the second region L12 of the capacitor body L1, as shown in FIGS. 2 and 3, the first inner electrodes 31, 32, 37 oppose the third and fourth inner electrodes 41, 42, 51, 52, with the dielectric layers 11, 13, 14, 16 therebetween. Therefore, the second inner electrodes 31, 32, 37 and third and fourth inner electrodes 41, 42, 51, 52 form a capacitance C12, thereby constructing one of capacitors included in the multilayer capacitor array CA1.

Figure 4:
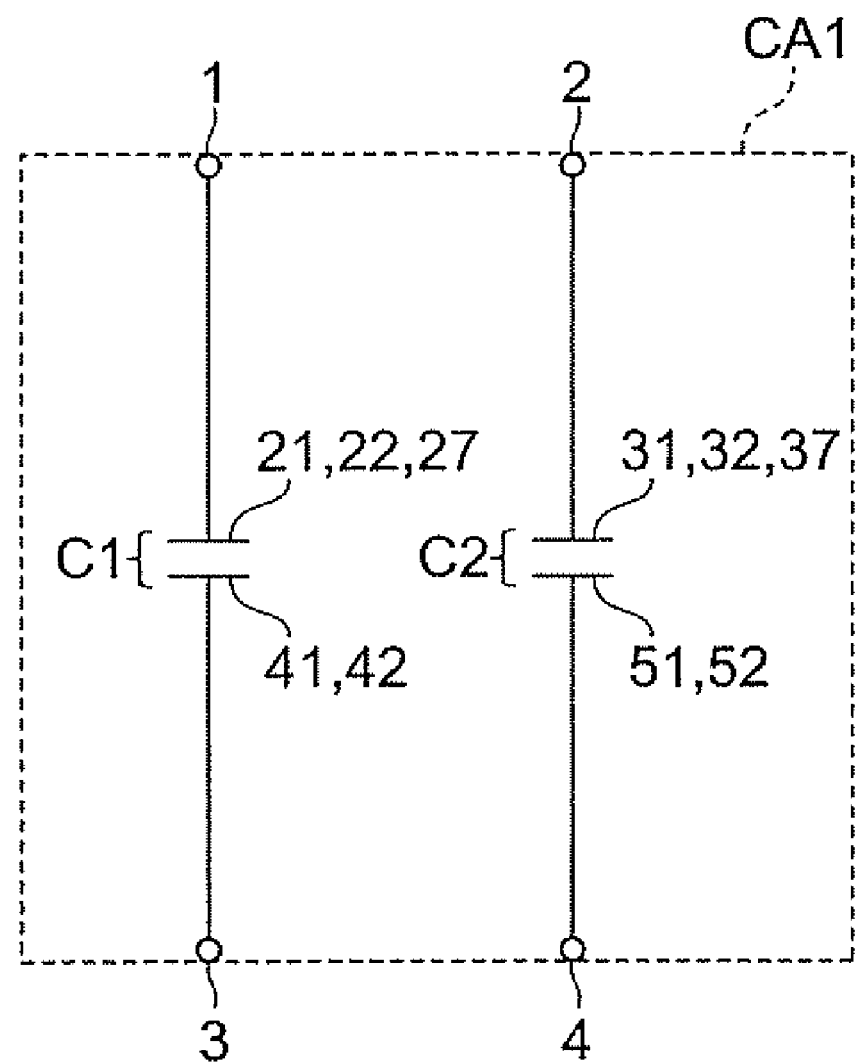
FIG. 4 is an equivalent circuit diagram of the multilayer capacitor array in accordance with the first embodiment.

FIG. 4 shows an equivalent circuit diagram of the multilayer capacitor array CA1. As shown in FIG. 4, capacitors C1 and C12 are formed in the multilayer capacitor array CA1.

The third and fourth inner electrodes 41, 42, 51, 52 contributing to forming a plurality of capacitors C11, C12 in the multilayer capacitor array CA1 are arranged so as to extend over the first and second regions L11, L12 when seen in the opposing direction of the first and second main faces L1a, L1b. Therefore, even when a voltage is applied to the capacitor C11 formed by the first inner electrodes 21, 22, 27 and third and fourth inner electrodes 41, 42, 51, 52 and the capacitor C12 formed by the second inner electrodes 31, 32, 37 and third and fourth inner electrodes 41, 42, 51, 52, so that electrostriction is generated in these capacitors, the third and fourth inner electrodes 41, 42, 51, 52 exist between the first and second regions L11, L12, i.e., between the two capacitors C11, C12, as can be seen from FIG. 3, whereby electrostriction also occurs in this portion. This restrains stresses from being concentrated between the two capacitors C11, C12.

The third and fourth inner electrodes 41, 42, 51, 52 are arranged adjacent to each other within the capacitor body L1. At a location where inner electrodes having the same polarity are adjacent to each other and oppose each other, no electric field occurs even when a voltage is applied to the multilayer capacitor array CA1. Namely, at locations where the third and fourth inner electrodes 41, 51 are adjacent to each other and where the third and fourth inner electrodes 42, 52 are adjacent to each other, these adjacent inner electrodes generate no electric fields. This correspondingly suppresses the vibration of the multilayer capacitor array CA1 caused by the electrostriction.

Second Embodiment

Figure 5:
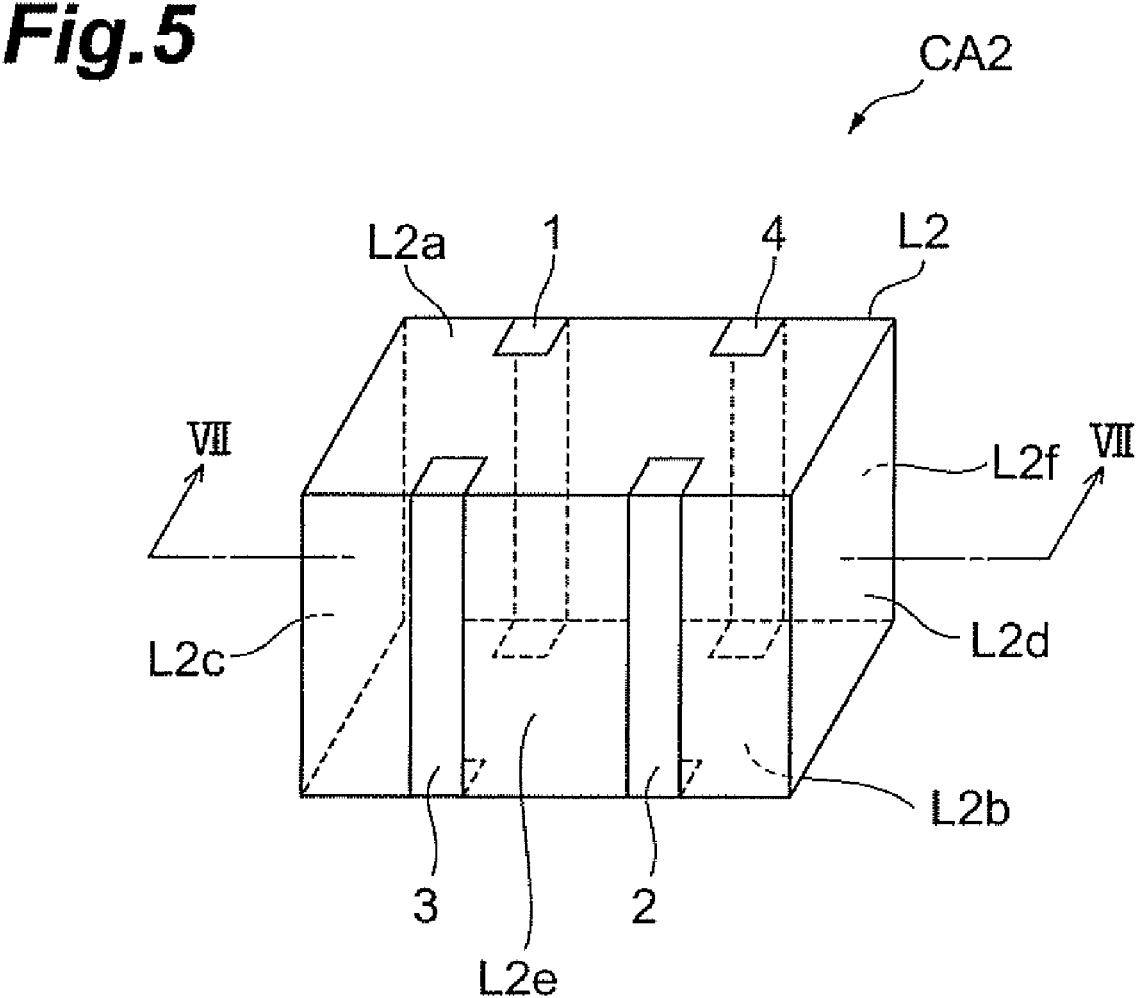
FIG. 5 is a perspective view of the multilayer capacitor array in accordance with the second embodiment.
Figure 6:
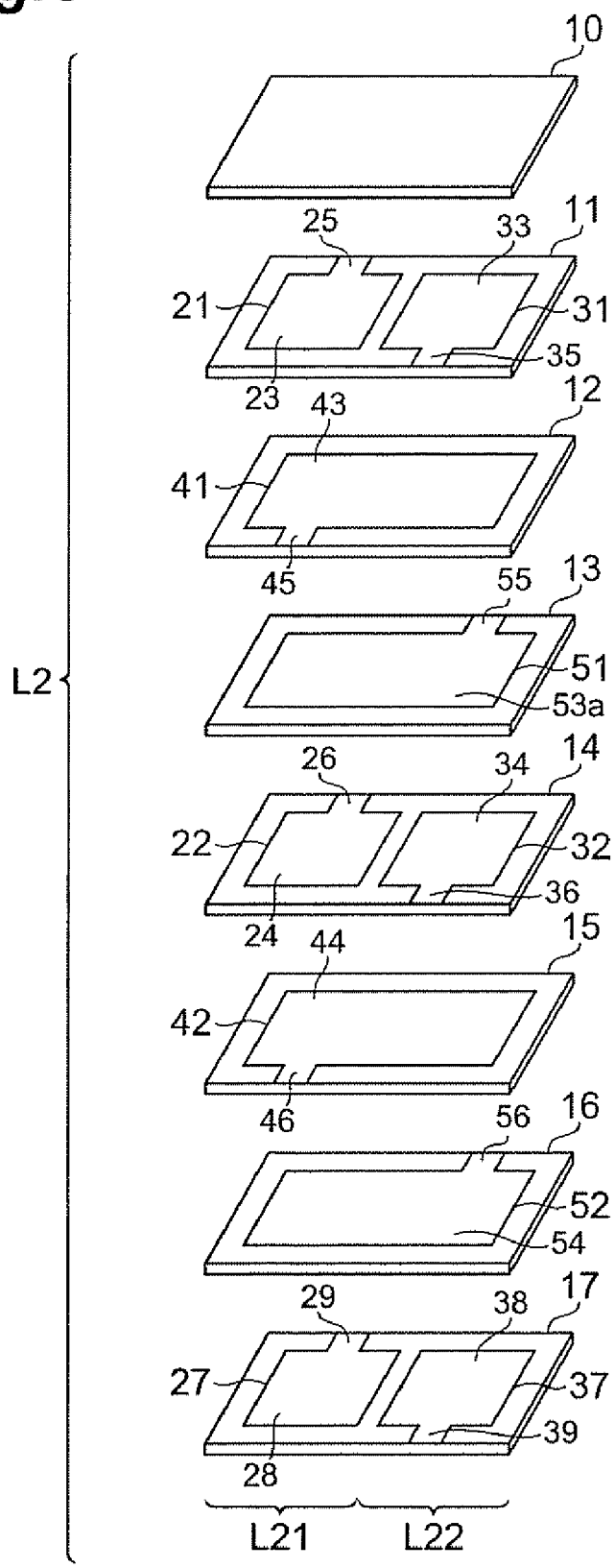
FIG. 6 is an exploded perspective view of the capacitor body included in the multilayer capacitor array in accordance with the second embodiment.
Figure 7:
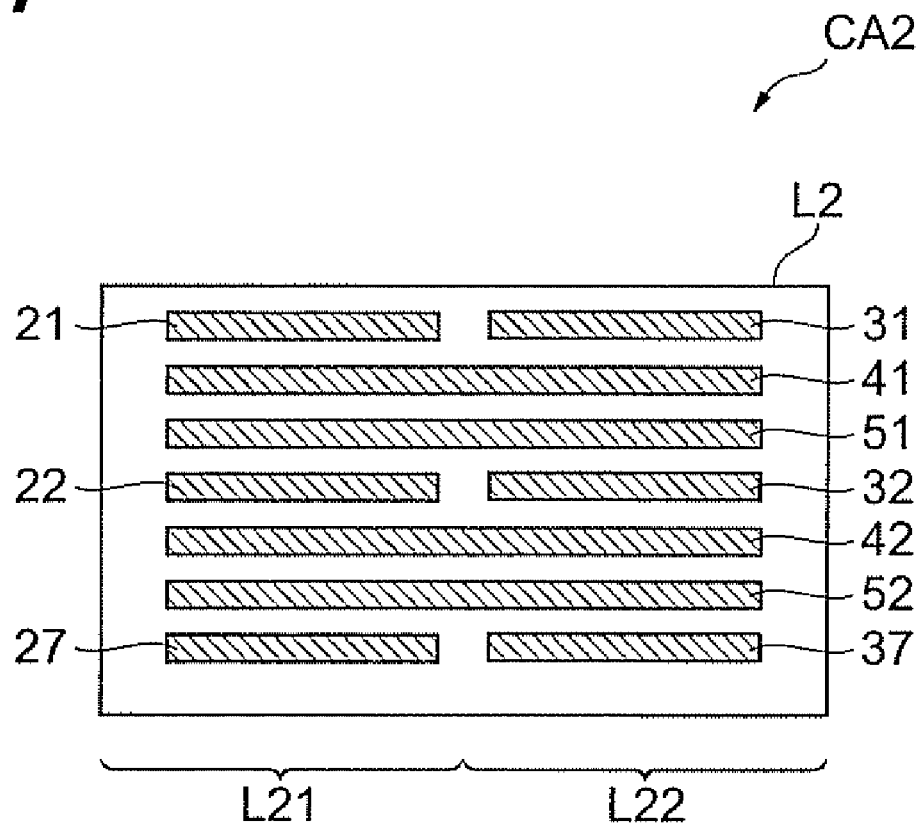
FIG. 7 is a view for explaining a cross-sectional structure of the multilayer capacitor array taken along the line VII-VII of FIG. 5.

With reference to FIGS. 5 to 7, the structure of the multilayer capacitor array CA2 in accordance with the second embodiment will be explained. FIG. 5 is a perspective view of the multilayer capacitor array in accordance with the second embodiment. FIG. 6 is an exploded perspective view of the capacitor body included in the multilayer capacitor array in accordance with the second embodiment. FIG. 7 is a view for explaining the structure of the multilayer capacitor array taken along the line VII-VII of FIG. 5.

As shown in FIG. 5, the multilayer capacitor array CA2 in accordance with the second embodiment comprises a capacitor body L2, and first to fourth terminal electrodes 1 to 4 arranged on outer surface of the capacitor body L2.

As shown in FIG. 5, the capacitor body L2 is shaped like a rectangular parallelepiped having rectangular first and second main faces L2a, L2b opposing each other, first and second end faces L2c, L2d opposing each other and extending in the shorter-side direction of the first and second main faces L2a, L2b so as to connect them to each other, and first and second side faces L2e, L2f opposing each other and extending in the longer-side direction of the first and second main faces L2a, L2b so as to connect them to each other.

The first and fourth terminal electrodes 1, 4 are arranged on the second side face L2f of the capacitor body L2. The first and fourth terminal electrodes 1, 4 are successively arranged from the first end face L2c side to the second end face L2d side. The third and second terminal electrodes 3, 2 are arranged on the first side face L2e of the capacitor body L2 opposing the second side face L2f. The third and second terminal electrodes 3, 2 are successively arranged from the first end face L2c side to the second end face L2d side.

As shown in FIG. 6, the capacitor body L2 has a plurality of (8 in this embodiment) laminated dielectric layers 10 to 17. As shown in FIG. 6, a plurality (3 layers in this embodiment) of first inner electrodes 21, 22, 27, a plurality (3 layers in this embodiment) of second inner electrodes 31, 32, 37, a plurality (2 layers in this embodiment) of third inner electrodes 41, 42, and a plurality (2 layers in this embodiment) of fourth inner electrodes 51, 52 are arranged in the capacitor body L2.

The first inner electrodes 21, 22, 27 are arranged in a first region L21 extending in the opposing direction of the first and second main faces L2a, L2b within the capacitor body L2. The second inner electrodes 31, 32, 37 are arranged in a second region L22 extending in the opposing direction of the first and second main faces L2a, L2b within the capacitor body L2.

The third inner electrodes 41, 42 are arranged within the capacitor body L2 so as to extend over the first and second regions L21, L22. The fourth inner electrodes 51, 52 are arranged within the capacitor body L2 so as to extend over the first and second regions L21, L22.

The first and second regions L21, L22 are arranged in a row along the opposing direction of the first and second end faces L2c, L2d, which is a direction orthogonal to the opposing direction of the first and second main faces L2a, L2b. The first region L21 corresponds to an area on the first end face L2c side of the capacitor body L2, while the second region L22 corresponds to an area on the second end face L2d side of the capacitor body L2.

Within the capacitor body L2, the first inner electrode 21 and second inner electrode 31 are arranged at the same position in the opposing direction of the first and second main faces L2a, L2b. Specifically, the first and second inner electrodes 21, 31 are positioned between the dielectric layers 10, 11. The first and second inner electrodes 21, 31 are arranged in a row along the opposing direction of the first and second end faces L2c, L2d in the capacitor body L2. The first and second inner electrodes 21, 31 are arranged on the sides of the first and second end faces L2c, L2d, respectively.

Within the capacitor body L2, the first inner electrode 22 and second inner electrode 32 are arranged at the same position in the opposing direction of the first and second main faces L2a, L2b. Specifically, the first and second inner electrodes 22, 32 are positioned between the dielectric layers 13, 14. The first and second inner electrodes 22, 32 are arranged in a row along the opposing direction of the first and second end faces L2c, L2d in the capacitor body L2. The first and second inner electrodes 22, 32 are arranged on the sides of the first and second end faces L2c, L2d, respectively.

Within the capacitor body L2, the first inner electrode 27 and second inner electrode 37 are arranged at the same position in the opposing direction of the first and second main faces L2a, L2b. Specifically, the first and second inner electrodes 27, 37 are positioned between the dielectric layers 16, 17. The first and second inner electrodes 27, 37 are arranged in a row along the opposing direction of the first and second end faces L2c, L2d in the capacitor body L2. The first and second inner electrodes 27, 37 are arranged on the sides of the first and second end faces L2c, L2d, respectively.

Within the capacitor body L2, the plurality of inner electrodes are arranged in the order of the first and second inner electrodes 21, 31, third inner electrode 41, fourth inner electrode 51, first and second inner electrodes 22, 32, third inner electrode 42, fourth inner electrode 52, and first and second inner electrodes 27, 37 from the first main face L2a toward the second main face L2b.

The opposing relationship within the first region L21 will now be explained in detail. The first and third inner electrodes 21, 41 oppose each other in the opposing direction of the first and second main faces L2a, L2b, with the dielectric layer 11 therebetween. The third and fourth inner electrodes 41, 51 oppose each other along the opposing direction of the first and second main faces L2a, L2b, with the dielectric layer 12 therebetween. The fourth and first inner electrodes 51, 22 oppose each other along the opposing direction of the first and second main faces L2a, L2b, with the dielectric layer 13 therebetween. The first and third inner electrodes 22, 42 oppose each other along the opposing direction of the first and second main faces L2a, L2b, with the dielectric layer 14 therebetween. The third and fourth inner electrodes 42, 52 oppose each other along the opposing direction of the first and second main faces L2a, L2b, with the dielectric layer 15 therebetween. The fourth and first inner electrode 52, 27 oppose each other along the opposing direction of the first and second main faces L2a, L2b, with the dielectric layer 16 therebetween.

The opposing relationship within the second region L22 will now be explained in detail. The second and third inner electrodes 31, 41 oppose each other in the opposing direction of the first and second main faces L2a, L2b, with the dielectric layer 11 therebetween. The third and fourth inner electrodes 41, 51 oppose each other along the opposing direction of the first and second main faces L2a, L2b, with the dielectric layer 12 therebetween. The fourth and second inner electrodes 51, 32 oppose each other along the opposing direction of the first and second main faces L2a, L2b, with the dielectric layer 13 therebetween. The second and third inner electrodes 32, 42 oppose each other along the opposing direction of the first and second main faces L2a, L2b, with the dielectric layer 14 therebetween. The third and fourth inner electrodes 42, 52 oppose each other along the opposing direction of the first and second main faces L2a, L2b, with the dielectric layer 15 therebetween. The fourth and second inner electrode 52, 37 oppose each other along the opposing direction of the first and second main faces L2a, L2b, with the dielectric layer 16 therebetween.

The third inner electrode 41 and fourth inner electrode 51 are adjacent to each other along the opposing direction of the first and second main faces L2a, L2b, with the dielectric layer 12 therebetween. The third inner electrode 42 and fourth inner electrode 52 are adjacent to each other along the opposing direction of the first and second main faces L2a, L2b, with the dielectric layer 15 therebetween.

The first inner electrodes 21, 22, 27 include main electrode portions 23, 24, 28 and lead portions 25, 26, 29 extending from the main electrode portions 23, 24, 28 so as to be exposed at the second side face L2f. The lead portions 25, 26, 29 exposed at the second side face L2f are physically and electrically connected to the first terminal electrode 1.

The second inner electrodes 31, 32, 37 include main electrode portions 33, 34, 38 and lead portions 35, 36, 39 extending from the main electrode portions 33, 34, 38 so as to be exposed at the first side face L2e. The lead portions 35, 36, 39 exposed at the first side face L2e are physically and electrically connected to the second terminal electrode 2.

The third inner electrodes 41, 42 include main electrode portions 43, 44 and lead portions 45, 46 extending from the main electrode portions 43, 44 so as to be exposed at the first side face L2e. The lead portions 45, 46 exposed at the first side face L2e are physically and electrically connected to the third terminal electrode 3.

The fourth inner electrodes 51, 52 include main electrode portions 53, 54 and lead portions 55, 56 extending from the main electrode portions 53, 54 so as to be exposed at the second side face L2f. The lead portions 55, 56 exposed at the second side face L2f are physically and electrically connected to the fourth terminal electrode 4.

In the first region L21 of the capacitor body L2, as shown in FIG. 7, the first inner electrodes 21, 22, 27 and third and fourth inner electrodes 41, 42, 51, 52 form a capacitance, thereby constructing one of capacitors included in the multilayer capacitor array CA2. In the second region L22 of the capacitor body L2, the second inner electrodes 31, 32, 37 and third and fourth inner electrodes 41, 42, 51, 52 form a capacitance, thereby constructing another capacitor included in the multilayer capacitor array CA2. Thus, two capacitors are formed in the multilayer capacitor array CA2. In FIG. 7, the hatching of the region corresponding to the dielectric layers 10 to 17 is omitted for the convenience of viewing.

The third and fourth inner electrodes 41, 42, 51, 52 contributing to forming a plurality of capacitors in the multilayer capacitor array CA2 are arranged so as to extend over the first and second regions L21, L22. Therefore, even when a voltage is applied to the capacitor formed by the first inner electrodes 21, 22, 27 and third and fourth inner electrodes 41, 42, 51, 52 and the capacitor formed by the second inner electrodes 31, 32, 37 and third and fourth inner electrodes 41, 42, 51, 52, so that electrostriction is generated in these capacitors, the third and fourth inner electrodes 41, 42, 51, 52 exist between the first and second regions L21, L22, i.e., between the two capacitors, as can be seen from FIG. 7, whereby electrostriction also occurs in this portion. This restrains stresses from being concentrated between the two capacitors.

The third and fourth inner electrodes 41, 42, 51, 52 are arranged adjacent to each other within the capacitor body L2. At a location where inner electrodes having the same polarity are adjacent to each other and oppose each other, no electric field occurs even when a voltage is applied to the multilayer capacitor array CA2. Namely, at locations where the third and fourth inner electrodes 41, 51 are adjacent to each other and where the third and fourth inner electrodes 42, 52 are adjacent to each other, these adjacent inner electrodes generate no electric fields. This correspondingly suppresses the vibration of the multilayer capacitor array CA2 caused by the electrostriction.

Third Embodiment

Figure 8:
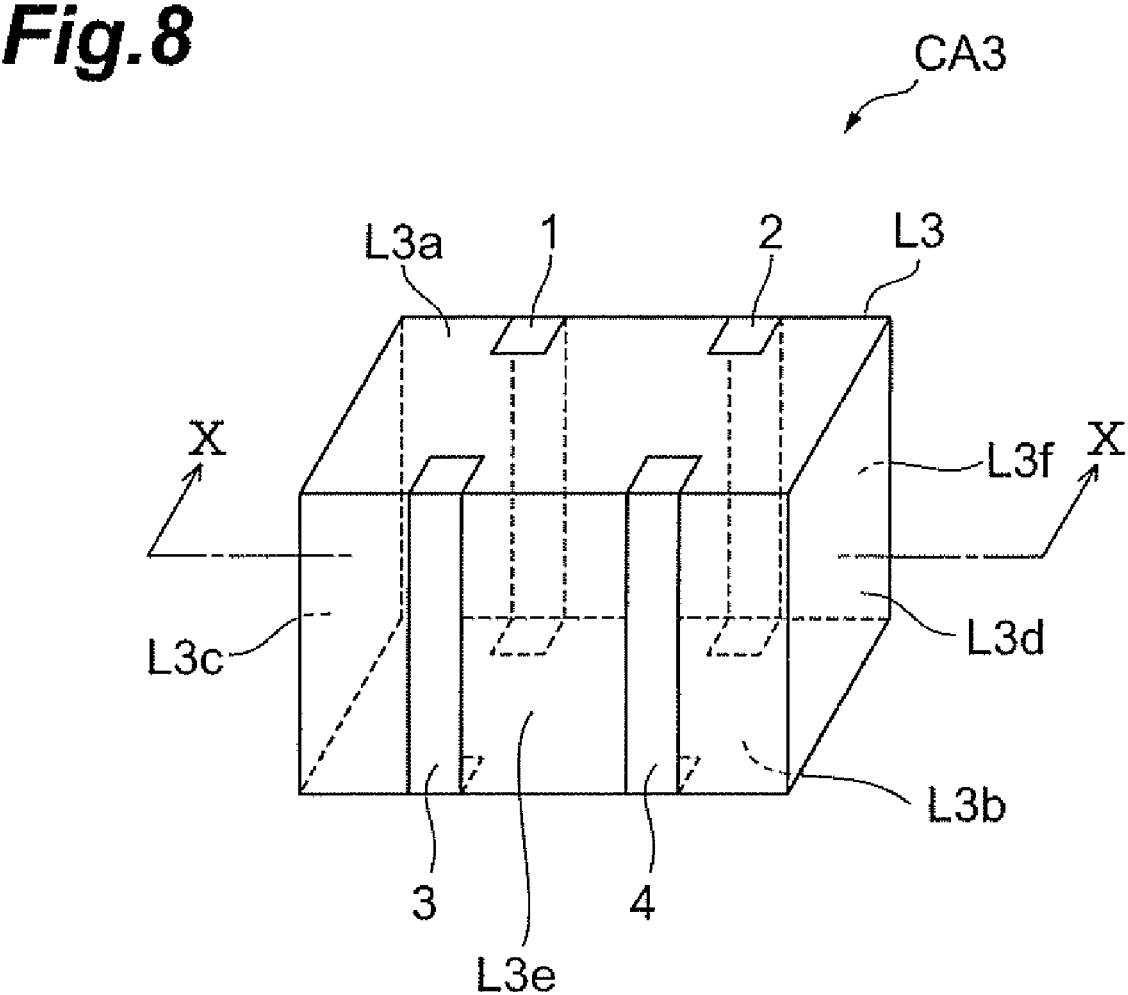
FIG. 8 is a perspective view of the multilayer capacitor array in accordance with the third embodiment.
Figure 9:
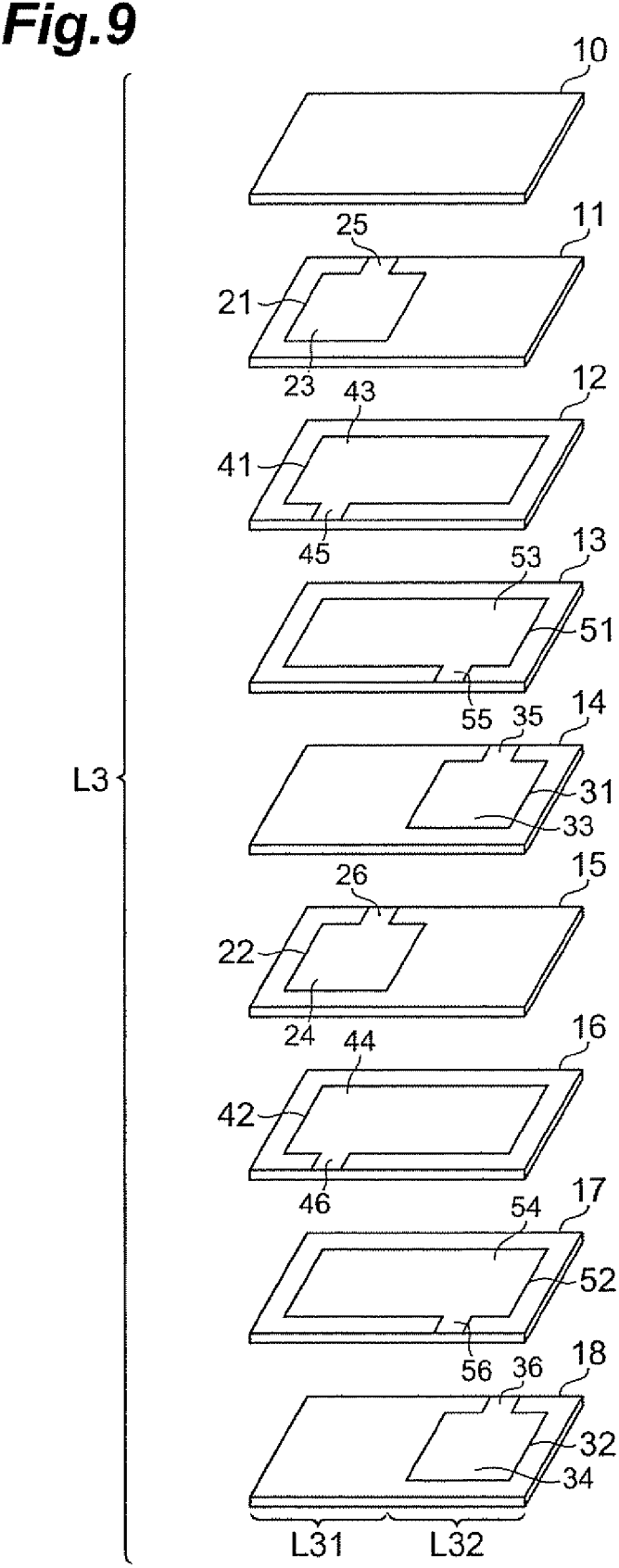
FIG. 9 is an exploded perspective view of the capacitor body included in the multilayer capacitor array in accordance with the third embodiment.
Figure 10:
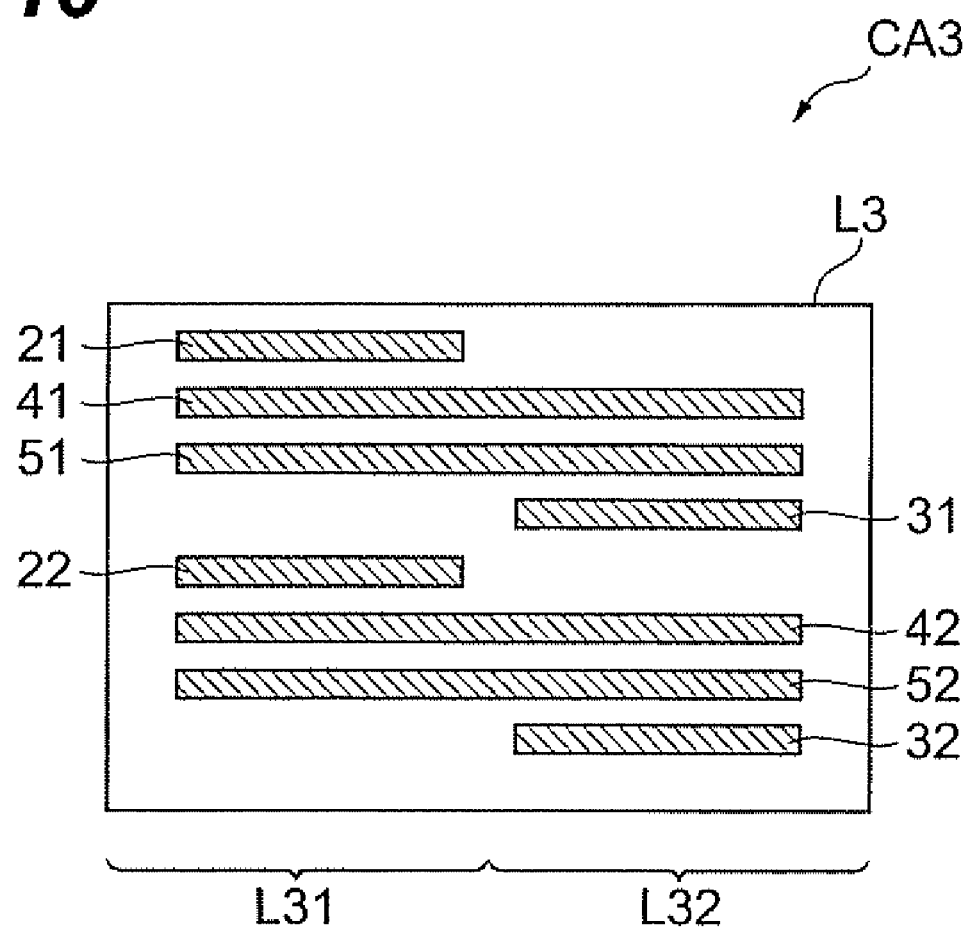
FIG. 10 is a view for explaining a cross-sectional structure of the multilayer capacitor array taken along the line X-X of FIG. 8.

With reference to FIGS. 8 to 10, the structure of the multilayer capacitor array CA3 in accordance with the third embodiment will be explained. FIG. 8 is a perspective view of the multilayer capacitor array in accordance with the third embodiment. FIG. 9 is an exploded perspective view of the capacitor body included in the multilayer capacitor array in accordance with the third embodiment. FIG. 10 is a view for explaining the structure of the multilayer capacitor array taken along the line X-X of FIG. 8.

As shown in FIG. 8, the multilayer capacitor array CA3 in accordance with the third embodiment comprises a capacitor body L3, and first to fourth terminal electrodes 1 to 4 arranged on outer surface of the capacitor body L3.

As shown in FIG. 8, the capacitor body L3 is shaped like a rectangular parallelepiped having rectangular first and second main faces L3a, L3b opposing each other, first and second end faces L3c, L3d opposing each other and extending in the shorter-side direction of the first and second main faces L3a, L3b so as to connect them to each other, and first and second side faces L3e, L3f opposing each other and extending in the longer-side direction of the first and second main faces L3a, L3b so as to connect them to each other.

The first and second terminal electrodes 1, 2 are arranged on the second side face L3f of the capacitor body L3. The first and second terminal electrodes 1, 2 are successively arranged from the first end face L3c side to the second end face L3d side. The third and fourth terminal electrodes 3, 4 are arranged on the first side face L3e of the capacitor body L3 opposing the second side face L3f. The third and fourth terminal electrodes 3, 4 are successively arranged from the first end face L3c side to the second end face L3d side.

As shown in FIG. 9, the capacitor body L3 has a plurality of (9 in this embodiment) laminated dielectric layers 10 to 18. As shown in FIG. 9, a plurality (2 layers in this embodiment) of first inner electrodes 21, 22, a plurality (2 layers in this embodiment) of second inner electrodes 31, 32, a plurality (2 layers in this embodiment) of third inner electrodes 41, 42, and a plurality (2 layers in this embodiment) of fourth inner electrodes 51, 52 are arranged in the capacitor body L3.

The first inner electrodes 21, 22 are arranged in a first region L31 extending in the opposing direction of the first and second main faces L3a, L3b within the capacitor body L3. The second inner electrodes 31, 32 are arranged in a second region L32 extending in the opposing direction of the first and second main faces L3a, L3b within the capacitor body L3.

The third inner electrodes 41, 42 are arranged within the capacitor body L3 so as to extend over the first and second regions L31, L32. The fourth inner electrodes 51, 52 are arranged within the capacitor body L3 so as to extend over the first and second regions L31, L32.

The first and second regions L31, L32 are arranged in a row along the opposing direction of the first and second end faces L3c, L3d, which is a direction orthogonal to the opposing direction of the first and second main faces L3a, L3b. The first region L31 corresponds to an area on the first end face L3c side of the capacitor body L3, while the second region L32 corresponds to an area on the second end face L3d side of the capacitor body L3.

The first inner electrode 21 is arranged at a position different from that of any of the plurality of second inner electrodes 31, 32 in the opposing direction of the first and second main faces L3a, L3b in the capacitor body L3. The first inner electrode 22 is arranged at a position different from that of any of the plurality of second inner electrodes 31, 32 in the opposing direction of the first and second main faces L3a, L3b in the capacitor body L3. The second inner electrode 31 is arranged at a position different from that of any of the plurality of first inner electrodes 21, 22 in the opposing direction of the first and second main faces L3a, L3b in the capacitor body L3. The second inner electrode 32 is arranged at a position different from that of any of the plurality of first inner electrodes 21, 22 in the opposing direction of the first and second main faces L3a, L3b in the capacitor body L3.

When seen in the opposing direction of the first and second main faces L3a, L3b of the capacitor body, the first inner electrodes 21, 22 and the second inner electrodes 31, 32 are arranged in a row along the opposing direction of the first and second end faces L3c, L3d. When seen in the opposing direction of the first and second main faces L3a, L3b of the capacitor body, the first inner electrodes 21, 22 are positioned on the first end face L3c side in the opposing direction of the first and second end faces L3c, L3d. When seen in the opposing direction of the first and second main faces L3a, L3b of the capacitor body, the second inner electrodes 31, 32 are positioned on the second end face L3d side in the opposing direction of the first and second end faces L3c, L3d.

When seen in the opposing direction of the first and second main faces L3a, L3b of the capacitor body, the first inner electrodes 21, 22 have no areas opposing the second inner electrodes 31, 32.

Within the capacitor body L3, the plurality of inner electrodes are arranged in the order of the first inner electrode 21, third inner electrode 41, fourth inner electrode 51, second inner electrode 31, first inner electrode 22, third inner electrode 42, fourth inner electrode 52, and second inner electrode 32 from the first main face L3a toward the second main face L3b.

The opposing relationship within the first region L31 will now be explained in detail. The first and third inner electrodes 21, 41 oppose each other in the opposing direction of the first and second main faces L3a, L3b, with the dielectric layer 11 therebetween. The third and fourth inner electrodes 41, 51 oppose each other in the opposing direction of the first and second main faces L3a, L3b, with the dielectric layer 12 therebetween. The fourth and first inner electrodes 51, 22 oppose each other in the opposing direction of the first and second main faces L3a, L3b, with the dielectric layers 13, 14 therebetween. The first and third inner electrodes 22, 42 oppose each other in the opposing direction of the first and second main faces L3a, L3b, with the dielectric layer 15 therebetween. The third and fourth inner electrodes 42, 52 oppose each other in the opposing direction of the first and second main faces L3a, L3b, with the dielectric layer 16 therebetween.

The opposing relationship within the second region L32 will now be explained in detail. The third and fourth inner electrodes 41, 51 oppose each other in the opposing direction of the first and second main faces L3a, L3b, with the dielectric layer 12 therebetween. The fourth and second inner electrodes 51, 31 oppose each other in the opposing direction of the first and second main faces L3a, L3b, with the dielectric layer 13 therebetween. The second and third inner electrodes 31, 42 oppose each other in the opposing direction of the first and second main faces L3a, L3b, with the dielectric layers 14, 15 therebetween. The third and fourth inner electrodes 42, 52 oppose each other in the opposing direction of the first and second main faces L3a, L3b, with the dielectric layer 16 therebetween. The fourth and second inner electrodes 52, 32 oppose each other in the opposing direction of the first and second main faces L3a, L3b, with the dielectric layer 17 therebetween.

The first main face L3a and third inner electrode 41 oppose each other in the opposing direction of the first and second main faces L3a, L3b, with the dielectric layers 10, 11 therebetween. The fourth inner electrode 52 and second main face L3b oppose each other in the opposing direction of the first and second main faces L3a, L3b, with the dielectric layers 17, 18 therebetween.

The third inner electrode 41 and fourth inner electrode 51 are adjacent to each other along the opposing direction of the first and second main faces L3a, L3b, with the dielectric layer 12 therebetween. The third inner electrode 42 and fourth inner electrode 52 are adjacent to each other along the opposing direction of the first and second main faces L3a, L3b, with the dielectric layer 16 therebetween.

The first inner electrodes 21, 22 include main electrode portions 23, 24 and lead portions 25, 26 extending from the main electrode portions 23, 24 so as to be exposed at the second side face L3f. The lead portions 25, 26 exposed at the second side face L3f are physically and electrically connected to the first terminal electrode 1.

The second inner electrodes 31, 32 include main electrode portions 33, 34 and lead portions 35, 36 extending from the main electrode portions 33, 34 so as to be exposed at the second side face L3f. The lead portions 35, 36 exposed at the second side face L3f are physically and electrically connected to the second terminal electrode 2.

The third inner electrodes 41, 42 include main electrode portions 43, 44 and lead portions 45, 46 extending from the main electrode portions 43, 44 so as to be exposed at the first side face L3e. The lead portions 45, 46 exposed at the first side face L3e are physically and electrically connected to the third terminal electrode 3.

The fourth inner electrodes 51, 52 include main electrode portions 53, 54 and lead portions 55, 56 extending from the main electrode portions 53, 54 so as to be exposed at the first side face L3e. The lead portions 55, 56 exposed at the first side face L3e are physically and electrically connected to the fourth terminal electrode 4.

In the first region L31 of the capacitor body L3, as shown in FIG. 10, the first inner electrodes 21, 22 and third and fourth inner electrodes 41, 42, 51 form a capacitance, thereby constructing one of capacitors included in the multilayer capacitor array CA3. In the second region L32 of the capacitor body L3, the second inner electrodes 31, 32 and third and fourth inner electrodes 42, 51, 52 form a capacitance, thereby constructing another capacitor included in the multilayer capacitor array CA3. Thus, two capacitors are formed in the multilayer capacitor array CA3. In FIG. 10, the hatching of the region corresponding to the dielectric layers 10 to 18 is omitted for the convenience of viewing.

The third and fourth inner electrodes 41, 42, 51, 52 contributing to forming a plurality of capacitors in the multilayer capacitor array CA3 are arranged so as to extend over the first and second regions L31, L32. Therefore, even when a voltage is applied to the capacitor formed by the first inner electrodes 21, 22 and third and fourth inner electrodes 41, 42, 51 and the capacitor formed by the second inner electrodes 31, 32 and third and fourth inner electrodes 42, 51, 52, so that electrostriction is generated in these capacitors, the third and fourth inner electrodes 41, 42, 51, 52 exist between the first and second regions L31, L32, i.e., between the two capacitors, as can be seen from FIG. 10, whereby electrostriction also occurs in this portion. This restrains stresses from being concentrated between the two capacitors.

The third and fourth inner electrodes 41, 42, 51, 52 are arranged adjacent to each other within the capacitor body L3. At a location where inner electrodes having the same polarity are adjacent to each other and oppose each other, no electric field occurs even when a voltage is applied to the multilayer capacitor array CA3. Namely, at locations where the third and fourth inner electrodes 41, 51 are adjacent to each other and where the third and fourth inner electrodes 42, 52 are adjacent to each other, these adjacent inner electrodes generate no electric fields. This correspondingly suppresses the vibration of the multilayer capacitor array CA3 caused by the electrostriction.

In the multilayer capacitor array CA3, each of the first inner electrodes 21, 22 is arranged at a position different from that of any of the plurality of second inner electrodes 31, 32 in the opposing direction of the first and second main faces L3a, L3b. Therefore, for example, the fourth inner electrode 51 attains a longer distance (two dielectric layers 13, 14) to one of the first and second inner electrodes 22, 31 (the first inner electrode 22 in this embodiment) than the distance (one dielectric layer 13) to the other (the second inner electrode 31 in this embodiment). When the distance between inner electrodes having polarities different from each other can be made greater as such, the vibration caused by the electrostriction can be suppressed.

Fourth Embodiment

Figure 11:
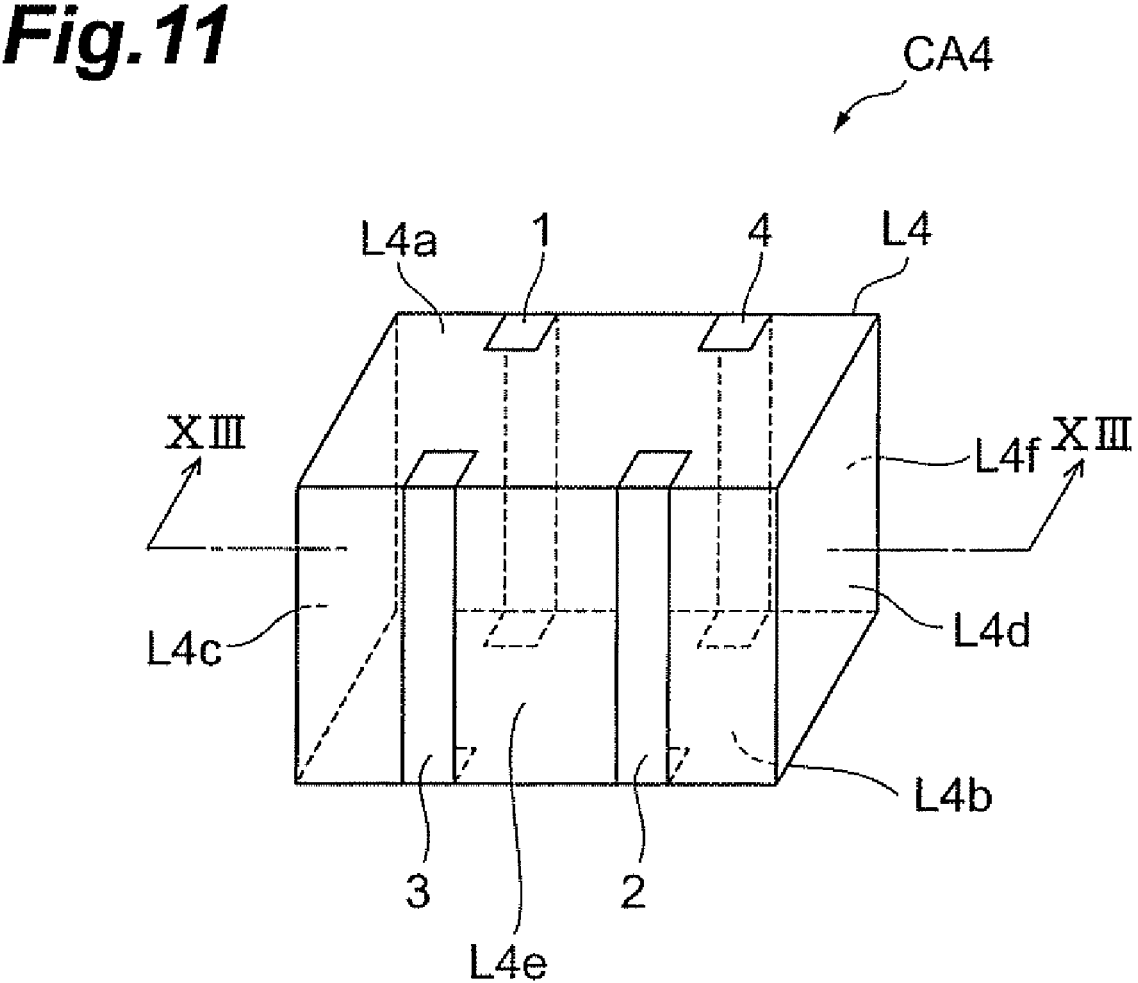
FIG. 11 is a perspective view of the multilayer capacitor array in accordance with the fourth embodiment.
Figure 12:
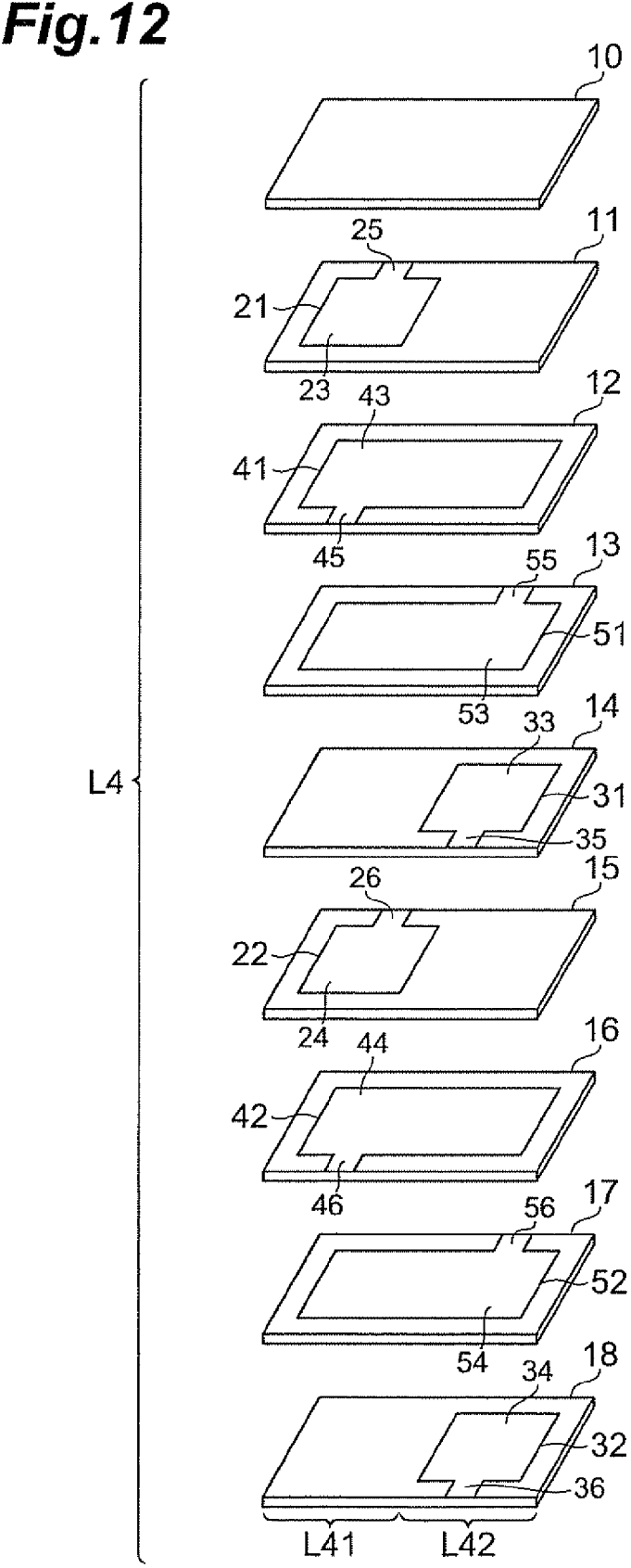
FIG. 12 is an exploded perspective view of the capacitor body included in the multilayer capacitor array in accordance with the fourth embodiment.
Figure 13:
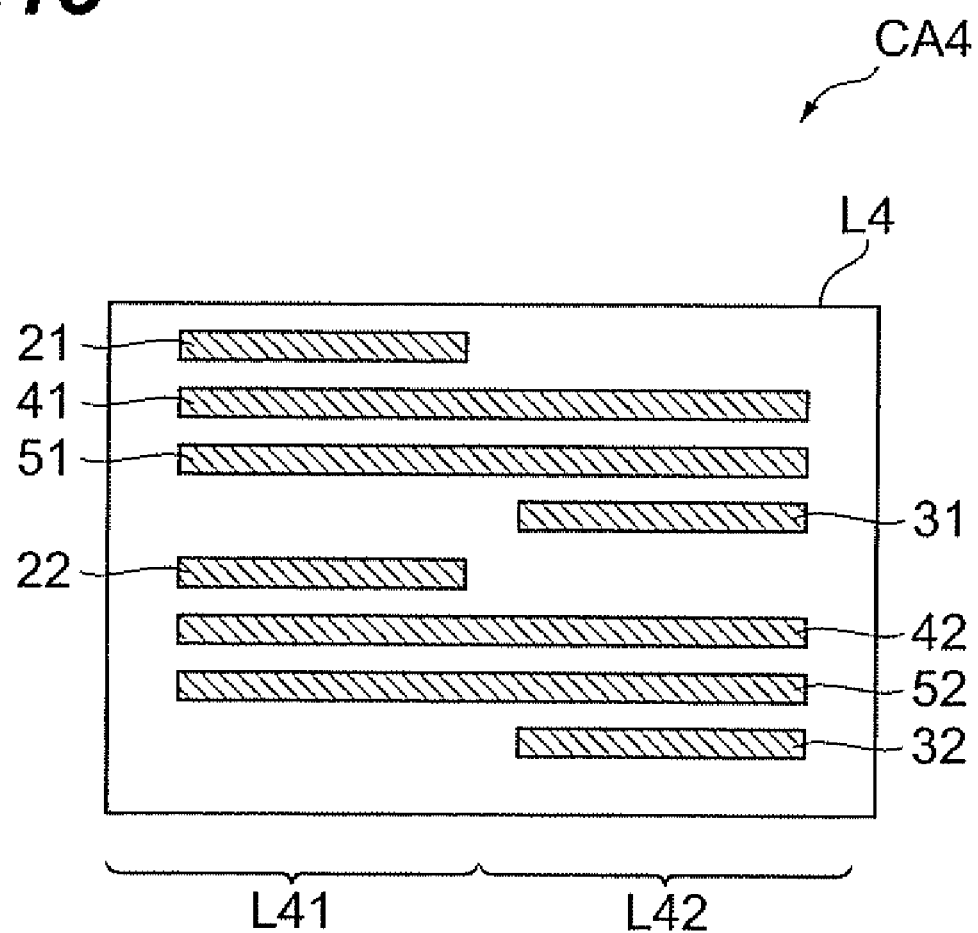
FIG. 13 is a view for explaining a cross-sectional structure of the multilayer capacitor array taken along the line XIII-XIII of FIG. 11.

With reference to FIGS. 11 to 13, the structure of the multilayer capacitor array CA4 in accordance with the fourth embodiment will be explained. FIG. 11 is a perspective view of the multilayer capacitor array in accordance with the fourth embodiment. FIG. 12 is an exploded perspective view of the capacitor body included in the multilayer capacitor array in accordance with the fourth embodiment. FIG. 13 is a view for explaining the structure of the multilayer capacitor array taken along the line XIII-XIII of FIG. 11.

As shown in FIG. 11, the multilayer capacitor array CA4 in accordance with the fourth embodiment comprises a capacitor body L4, and first to fourth terminal electrodes 1 to 4 arranged on outer surface of the capacitor body L4.

As shown in FIG. 11, the capacitor body L4 is shaped like a rectangular parallelepiped having rectangular first and second main faces L4a, L4b opposing each other, first and second end faces L4c, L4d opposing each other and extending in the shorter-side direction of the first and second main faces L4a, L4b so as to connect them to each other, and first and second side faces L4e, L4f opposing each other and extending in the longer-side direction of the first and second main faces L4a, L4b so as to connect them to each other.

The first and fourth terminal electrodes 1, 4 are arranged on the second side face L4f of the capacitor body L4. The first and fourth terminal electrodes 1, 4 are successively arranged from the first end face L4c side to the second end face L4d side. The second and third terminal electrodes 2, 3 are arranged on the first side face L4e of the capacitor body L4 opposing the second side face L4f. The second and third terminal electrodes 2, 3 are successively arranged from the first end face L4c side to the second end face L4d side.

As shown in FIG. 12, the capacitor body L4 has a plurality of (9 in this embodiment) laminated dielectric layers 10 to 18. As shown in FIG. 12, a plurality (2 layers in this embodiment) of first inner electrodes 21, 22, a plurality (2 layers in this embodiment) of second inner electrodes 31, 32, a plurality (2 layers in this embodiment) of third inner electrodes 41, 42, and a plurality (2 layers in this embodiment) of fourth inner electrodes 51, 52 are arranged in the capacitor body L4.

The first inner electrodes 21, 22 are arranged in a first region L41 extending in the opposing direction of the first and second main faces L4a, L4b within the capacitor body L4. The second inner electrodes 31, 32 are arranged in a second region L42 extending in the opposing direction of the first and second main faces L4a, L4b within the capacitor body L4.

The third inner electrodes 41, 42 are arranged within the capacitor body L4 so as to extend over the first and second regions L41, L42. The fourth inner electrodes 51, 52 are arranged within the capacitor body L4 so as to extend over the first and second regions L41, L42.

The first and second regions L41, L42 are arranged in a row along the opposing direction of the first and second end faces L4c, L4d, which is a direction orthogonal to the opposing direction of the first and second main faces L4a, L4b. The first region L41 corresponds to an area on the first end face L4c side of the capacitor body L4, while the second region L42 corresponds to an area on the second end face L4d side of the capacitor body L4.

In the opposing direction of the first and second main faces L4a, L4b of the capacitor body L4, each of the first inner electrodes 21, 22 is arranged at a position different from that of any of the plurality of second inner electrodes 31, 32. In the opposing direction of the first and second main faces L4a, L4b of the capacitor body L4, each of the second inner electrodes 31, 32 is arranged at a position different from that of any of the plurality of first inner electrodes 21, 22.

When seen in the opposing direction of the first and second main faces L4a, L4b of the capacitor body, the first inner electrodes 21, 22 and the second inner electrodes 31, 32 are arranged in a row along the opposing direction of the first and second end faces L4c, L4d. When seen in the opposing direction of the first and second main faces L4a, L4b of the capacitor body, the first inner electrodes 21, 22 are positioned on the first end face L4c side in the opposing direction of the first and second end faces L4c, L4d. When seen in the opposing direction of the first and second main faces L4a, L4b of the capacitor body, the second inner electrodes 31, 32 are positioned on the second end face L4d side in the opposing direction of the first and second end faces L4c, L4d.

When seen in the opposing direction of the first and second main faces L4a, L4b of the capacitor body, the first inner electrodes 21, 22 have no areas opposing the second inner electrodes 31, 32.

Within the capacitor body L4, the plurality of inner electrodes are arranged in the order of the first inner electrode 21, third inner electrode 41, fourth inner electrode 51, second inner electrode 31, first inner electrode 22, third inner electrode 42, fourth inner electrode 52, and second inner electrode 32 from the first main face L4a toward the second main face L4b.

The opposing relationship within the first region L41 will now be explained in detail. The first and third inner electrodes 21, 41 oppose each other in the opposing direction of the first and second main faces L4a, L4b, with the dielectric layer 11 therebetween. The third and fourth inner electrodes 41, 51 oppose each other in the opposing direction of the first and second main faces L4a, L4b, with the dielectric layer 12 therebetween. The fourth and first inner electrodes 51, 22 oppose each other in the opposing direction of the first and second main faces L4a, L4b, with the dielectric layers 13, 14 therebetween. The first and third inner electrodes 22, 42 oppose each other in the opposing direction of the first and second main faces L4a, L4b, with the dielectric layer 15 therebetween. The third and fourth inner electrodes 42, 52 oppose each other in the opposing direction of the first and second main faces L4a, L4b, with the dielectric layer 16 therebetween.

The opposing relationship within the second region L42 will now be explained in detail. The third and fourth inner electrodes 41, 51 oppose each other in the opposing direction of the first and second main faces L4a, L4b, with the dielectric layer 12 therebetween. The fourth and second inner electrodes 51, 31 oppose each other in the opposing direction of the first and second main faces L4a, L4b, with the dielectric layer 13 therebetween. The second and third inner electrodes 31, 42 oppose each other in the opposing direction of the first and second main faces L4a, L4b, with the dielectric layers 14, 15 therebetween. The third and fourth inner electrodes 42, 52 oppose each other in the opposing direction of the first and second main faces L4a, L4b, with the dielectric layer 16 therebetween. The fourth and second inner electrodes 52, 32 oppose each other in the opposing direction of the first and second main faces L4a, L4b, with the dielectric layer 17 therebetween.

The first main face L4a and third inner electrode 41 oppose each other in the opposing direction of the first and second main faces L4a, L4b, with the dielectric layers 10, 11 therebetween. The fourth inner electrode 52 and second main face L4b oppose each other in the opposing direction of the first and second main faces L4a, L4b, with the dielectric layers 17, 18 therebetween.

The third inner electrode 41 and fourth inner electrode 51 are adjacent to each other along the opposing direction of the first and second main faces L4a, L4b, with the dielectric layer 12 therebetween. The third inner electrode 42 and fourth inner electrode 52 are adjacent to each other along the opposing direction of the first and second main faces L4a, L4b, with the dielectric layer 16 therebetween.

The first inner electrodes 21, 22 include main electrode portions 23, 24 and lead portions 25, 26 extending from the main electrode portions 23, 24 so as to be exposed at the second side face L4f. The lead portions 25, 26 exposed at the second side face L4f are physically and electrically connected to the first terminal electrode 1.

The second inner electrodes 31, 32 include main electrode portions 33, 34 and lead portions 35, 36 extending from the main electrode portions 33, 34 so as to be exposed at the first side face L4e. The lead portions 35, 36 exposed at the first side face L4e are physically and electrically connected to the second terminal electrode 2.

The third inner electrodes 41, 42 include main electrode portions 43, 44 and lead portions 45, 46 extending from the main electrode portions 43, 44 so as to be exposed at the first side face L4e. The lead portions 45, 46 exposed at the first side face L4e are physically and electrically connected to the third terminal electrode 3.

The fourth inner electrodes 51, 52 include main electrode portions 53, 54 and lead portions 55, 56 extending from the main electrode portions 53, 54 so as to be exposed at the second side face L4f. The lead portions 55, 56 exposed at the second side face L4f are physically and electrically connected to the fourth terminal electrode 4.

In the multilayer capacitor array CA4, as shown in FIG. 13, the first inner electrodes 21, 22 and third and fourth inner electrodes 41, 42, 51 form a capacitance, thereby constructing one of capacitors included in the multilayer capacitor array CA4. Further, in the multilayer capacitor array CA4, the second inner electrodes 31, 32 and third and fourth inner electrodes 42, 51, 52 form a capacitance, thereby constructing another capacitor included in the multilayer capacitor array CA4. Thus, two capacitors are formed in the multilayer capacitor array CA4. In FIG. 13, the hatching of the region corresponding to the dielectric layers 10 to 18 is omitted for the convenience of viewing.

When seen in the opposing direction of the first and second main faces L4a, L4b, the third and fourth inner electrodes 41, 42, 51, 52 contributing to forming a plurality of capacitors included in the multilayer capacitor array CA4 are arranged so as to extend over the first and second inner electrodes 21, 22, 31, 32. Therefore, even when a voltage is applied to the capacitor C41 formed by the first inner electrodes 21, 22 and third and fourth inner electrodes 41, 42, 51 and the capacitor C42 formed by the second inner electrodes 31, 32 and third and fourth inner electrodes 42, 51, 52, so that electrostriction is generated in these capacitors, the third and fourth inner electrodes 41, 42, 51, 52 exist between the two capacitors C41, C42 as can be seen from FIG. 13, whereby electrostriction occurs. This restrains stresses from being concentrated between the two capacitors C41, C42.

The third and fourth inner electrodes 41, 42, 51, 52 contributing to forming a plurality of capacitors in the multilayer capacitor array CA4 are arranged so as to extend over the first and second regions L41, L42. Therefore, even when a voltage is applied to the capacitor formed by the first inner electrodes 21, 22 and third and fourth inner electrodes 41, 42, 51 and the capacitor formed by the second inner electrodes 31, 32 and third and fourth inner electrodes 42, 51, 52 so that electrostriction is generated in these capacitors, the third and fourth inner electrodes 41, 42, 51, 52 exist between the first and second regions L41, L42, i.e., between the two capacitors, as can be seen from FIG. 13, whereby electrostriction also occurs in this portion. This restrains stresses from being concentrated between the two capacitors.

The third and fourth inner electrodes 41, 42, 51, 52 are arranged adjacent to each other within the capacitor body L4. At a location where inner electrodes having the same polarity are adjacent to each other and oppose each other, no electric field occurs even when a voltage is applied to the multilayer capacitor array CA4. Namely, at locations where the third and fourth inner electrodes 41, 51 are adjacent to each other and where the third and fourth inner electrodes 42, 52 are adjacent to each other, these adjacent inner electrodes generate no electric fields. This correspondingly suppresses the vibration of the multilayer capacitor array CA4 caused by the electrostriction.

In the multilayer capacitor array CA4, each of the first inner electrodes 21, 22 is arranged at a position different from that of any of the plurality of second inner electrodes 31, 32 in the opposing direction of the first and second main faces L4a, L4b. Therefore, for example, the fourth inner electrode 51 attains a longer distance (two dielectric layers 13, 14) to one of the first and second inner electrodes 22, 31 (the first inner electrode 22 in this embodiment) than the distance (one dielectric layer 13) to the other (the second inner electrode 31 in this embodiment). When the distance between inner electrodes having polarities different from each other can be made greater as such, the vibration caused by the electrostriction can be suppressed.

Though preferred embodiments of the present invention are explained in detail in the foregoing, the present invention is not limited to the above-mentioned embodiments. For example, the number of capacitors included in the multilayer capacitor array is not limited to that described in the above-mentioned embodiments. Also, the number of terminal electrodes 1 to 4 is not limited to that described in the above-mentioned embodiments.

The number of laminations of dielectric layers 10 to 18 and the numbers of laminations of first to fourth inner electrodes 21, 22, 31, 32, 41, 42, 51, 52 are not limited to those described in the above-mentioned embodiments. The number of laminations of inner electrodes may vary among the capacitors included in the multilayer capacitor array.

The forms of the first to fourth inner electrodes 21, 22, 31, 32, 41, 42, 51, 52 are not limited to those described in the above-mentioned embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array comprising:
   a capacitor body including rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other, the capacitor body having a dielectric characteristic;
   first, second, third, and fourth terminal electrodes arranged on an outer surface of the capacitor body;
   a plurality of first inner electrodes connected to the first terminal electrode and arranged within the capacitor body;
   a plurality of second inner electrodes connected to the second terminal electrode and arranged within the capacitor body;
   a plurality of third inner electrodes connected to the third terminal electrode but not to the fourth terminal electrode and arranged within the capacitor body; and
   a plurality of fourth inner electrodes connected to the fourth terminal electrode but not to the third terminal electrode and arranged within the capacitor body;
   wherein the capacitor body has a first region extending in an opposing direction of the first and second main faces, and a second region extending in the opposing direction of the first and second main faces and aligning with the first region along a direction orthogonal to the opposing direction of the first and second main faces;
   wherein the plurality of first inner electrodes are arranged within the first region;
   wherein the plurality of second inner electrodes are arranged within the second region;
   wherein the plurality of third inner electrodes are arranged so as to extend over the first and second regions;
   wherein the plurality of fourth inner electrodes are arranged so as to extend over the first and second regions;

wherein each of the third inner electrodes is arranged within the capacitor body so as to oppose at least one of the plurality of first inner electrodes with a portion of the capacitor body therebetween in the opposing direction of the first and second main faces and oppose at least one of the plurality of second inner electrodes with a portion of the capacitor body therebetween in the opposing direction of the first and second main faces;

wherein each of the fourth inner electrodes is arranged within the capacitor body so as to oppose at least one of the plurality of first inner electrodes with a portion of the capacitor body therebetween in the opposing direction of the first and second main faces and oppose at least one of the plurality of second inner electrodes with a portion of the capacitor body therebetween in the opposing direction of the first and second main faces;

wherein each of the third inner electrodes is adjacent to one of the plurality of fourth inner electrodes with a portion of the capacitor body therebetween along the opposing direction of the first and second main faces;

wherein each of the fourth inner electrodes is adjacent to one of the plurality of third inner electrodes with a portion of the capacitor body therebetween along the opposing direction of the first and second main faces; and wherein each of the first inner electrodes is arranged at a position different from that of any of the plurality of second inner electrodes in the opposing direction of the first and second main faces.

2. A multilayer capacitor array comprising:

a capacitor body including rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other, the capacitor body having a dielectric characteristic;

first, second, third, and fourth terminal electrodes arranged on an outer surface of the capacitor body;

a plurality of first inner electrodes connected to the first terminal electrode and arranged within the capacitor body;

a plurality of second inner electrodes connected to the second terminal electrode and arranged within the capacitor body;

a plurality of third inner electrodes connected to the third terminal electrode and arranged within the capacitor body; and a plurality of fourth inner electrodes connected to the fourth terminal electrode and arranged within the capacitor body;

wherein the capacitor body has a first region extending in an opposing direction of the first and second main faces, and a second region extending in the opposing direction of the first and second main faces and aligning with the first region along a direction orthogonal to the opposing direction of the first and second main faces;

wherein the plurality of first inner electrodes are arranged within the first region;

wherein the plurality of second inner electrodes are arranged within the second region;

wherein the plurality of third inner electrodes are arranged so as to extend over the first and second regions;

wherein the plurality of fourth inner electrodes are arranged so as to extend over the first and second regions;

wherein each of the third inner electrodes is arranged within the capacitor body so as to oppose at least one of the plurality of first inner electrodes with a portion of the capacitor body therebetween in the opposing direction of the first and second main faces and oppose at least one of the plurality of second inner electrodes with a portion of the capacitor body therebetween in the opposing direction of the first and second main faces;

wherein each of the fourth inner electrodes is arranged within the capacitor body so as to oppose at least one of the plurality of first inner electrodes with a portion of the capacitor body therebetween in the opposing direction of the first and second main faces and oppose at least one of the plurality of second inner electrodes with a portion of the capacitor body therebetween in the opposing direction of the first and second main faces;

wherein each of the third inner electrodes is adjacent to one of the plurality of fourth inner electrodes with a portion of the capacitor body therebetween along the opposing direction of the first and second main faces;

wherein each of the fourth inner electrodes is adjacent to one of the plurality of third inner electrodes with a portion of the capacitor body therebetween along the opposing direction of the first and second main faces, and wherein each of the first inner electrodes is arranged at a position different from that of any of the plurality of second inner electrodes in the opposing direction of the first and second main faces.

* * * * *